(12) United States Patent
Getsy

(10) Patent No.: US 12,104,705 B2
(45) Date of Patent: Oct. 1, 2024

(54) CHANNEL SELECTOR VALVE

(71) Applicant: American Sterilizer Company, Mentor, OH (US)

(72) Inventor: Andrew P. Getsy, Kirtland, OH (US)

(73) Assignee: American Sterilizer Company, Mentor, OH (US)

( * ) Notice: Subject to any disclaimer, the term of this patent is extended or adjusted under 35 U.S.C. 154(b) by 156 days.

(21) Appl. No.: 17/741,712

(22) Filed: May 11, 2022

(65) Prior Publication Data

US 2023/0366473 A1 Nov. 16, 2023

(51) Int. Cl.
| | | |
|---|---|---|
| F16K 11/074 | (2006.01) | |
| F16K 7/04 | (2006.01) | |
| F16K 31/04 | (2006.01) | |
| F16K 31/524 | (2006.01) | |
| F16K 37/00 | (2006.01) | |

(52) U.S. Cl.
CPC .............. *F16K 11/074* (2013.01); *F16K 7/04* (2013.01); *F16K 31/041* (2013.01); *F16K 31/524* (2013.01); *F16K 31/52491* (2013.01); *F16K 37/0008* (2013.01)

(58) Field of Classification Search
CPC ........ F16K 11/074; F16K 31/041; F16K 7/04; F16K 31/52491; F16K 37/0008; F16K 31/524
See application file for complete search history.

(56) References Cited

U.S. PATENT DOCUMENTS

| | | | | |
|---|---|---|---|---|
| 3,023,778 A | * | 3/1962 | Hayes | ................... B23Q 35/36 |
| | | | | 91/47 |
| 3,353,722 A | * | 11/1967 | Mehta | ..................... G01F 11/24 |
| | | | | 141/144 |
| 3,578,217 A | * | 5/1971 | Miller | ..................... B65B 3/323 |
| | | | | 426/414 |
| 4,604,093 A | | 8/1986 | Brown et al. | |
| 4,632,148 A | | 12/1986 | Stark, Sr. et al. | |
| (Continued) | | | | |

FOREIGN PATENT DOCUMENTS

| | | |
|---|---|---|
| CN | 105276234 A | 1/2016 |
| CN | 109806420 A | 5/2019 |
| (Continued) | | |

OTHER PUBLICATIONS

Idelson, et al., "Design and Performance Testing of a Novel In Vivo Laparoscope Lens Cleaning Device," Journal of Medical Devices, Sep. 2021, vol. 15.

(Continued)

*Primary Examiner* — Matthew W Jellett
*Assistant Examiner* — Christopher D Ballman
(74) *Attorney, Agent, or Firm* — KUSNER & JAFFE

(57) ABSTRACT

A multi-channel selector valve includes a housing, a rotor at least partially disposed within the housing and rotatable about an axis of rotation, the rotor having a first cam surface, and a stator at least partially disposed within the housing. The housing includes a plurality of flow controllers arranged about the axis of rotation of the rotor, each flow controller including an aperture, and a blocking member disposed adjacent to the cam surface, the blocking member selectively movable relative to the aperture to open and permit flow through the aperture.

20 Claims, 5 Drawing Sheets

(56) References Cited

U.S. PATENT DOCUMENTS

| | | | |
|---|---|---|---|
| 4,684,040 A * | 8/1987 | Jonovic | G01F 11/024 |
| | | | 222/218 |
| 5,613,511 A | 3/1997 | Andersen et al. | |
| 6,874,517 B2 | 4/2005 | Halstead et al. | |
| 7,806,851 B2 * | 10/2010 | Cerasoli | A61M 1/285 |
| | | | 604/32 |
| 8,459,302 B2 | 6/2013 | Pederson et al. | |
| 9,810,363 B2 * | 11/2017 | Ganzer | B05C 11/1042 |
| 10,094,480 B2 * | 10/2018 | Partridge | F16K 1/24 |
| 2007/0234495 A1 | 10/2007 | Suzuki et al. | |
| 2019/0314535 A1 | 10/2019 | Golkowski et al. | |

FOREIGN PATENT DOCUMENTS

| | | | |
|---|---|---|---|
| CN | 111396624 A | 7/2020 |
| FR | 1306090 A | 10/1962 |
| GB | 2560734 A | 9/2018 |
| KR | 10-2017-0135282 A | 12/2017 |

OTHER PUBLICATIONS

International Search Report and Written Opinion issued in corresponding International Application No. PCT/US2023/021293 dated Sep. 5, 2023.

* cited by examiner

CHANNEL SELECTOR VALVE

FIELD OF THE INVENTION

The present invention relates generally to valves and, more particularly, to a pinch valve that can open and close multiple fluid lines independent of one another.

BACKGROUND OF THE INVENTION

Valves are devices for controlling the passage of fluid or air through a pipe, duct, sleeves, or other similar devices. Conventional valves utilize closing elements to interfere with fluid flow. A pinch valve is a control valve that uses a pinching effect to obstruct flow in an internal sleeve. Pinch valves differ from conventional valves because pinch valves apply pressure on a sleeve to prevent flow, instead of using separate closing elements.

Pinch valves do not need closing elements and thus the flow of fluid through the valve will be unimpeded by closing elements. Pinch valves are frequently used in applications where solid or semi-solid material, such as powder, granules, pellets, fibers or similar material, flow within the sleeve.

Conventional pinch valves include mechanical pinch valves that apply pressure using a movable closure bar at one point of a circumference of a sleeve. Such pinch valves position the movable closure bar at the top of the circumference of the sleeve, so that the closure bar flattens the sleeve towards a fixed bottom to deform the sleeve. Other pinch valves utilize air pressure to flatten the sleeve. Alternatively, mechanically driven presses are mostly screw-driven because high forces are needed to close pressurized sleeves and usually require fully encased sleeves.

One drawback of conventional pinch valves is the size of the apparatus, which can take up a significant amount of space. Another drawback of conventional pinch valves is they often utilize pressurized air to close the channel, which requires additional space-consuming equipment, e.g., an air compressor. Yet another drawback with conventional pinch valves is they only open and close one channel.

Accordingly, there is a need in the art for a pinch valve that can open and close multiple and separate channels, one at a time, while also occupying a small footprint.

SUMMARY OF THE INVENTION

In accordance with the present invention, there is provided an apparatus that can open and close multiple channels, one at a time, while occupying a small footprint. The apparatus provides a pinching force to close channels in a nonintrusive and unrestrictive way. According to an embodiment of the invention, the apparatus includes an actuator that drives a rotor to selectively open and close multiple channels. The rotor includes an inverted cam, whereby one channel is opened while keeping all other channels closed by means of blocking members contacting the cam.

An advantage of the apparatus in accordance with the invention is that it provides a non-intrusive, non-restrictive way to control fluid flow of multiple channels. The apparatus is mechanically simple and compact with a limited number of parts, and the moving components simply ride in slots. Another advantage of the apparatus in accordance with the invention is that it has a small footprint, can easily fit into a small tabletop unit or other location that has limited space, and does not require an air compressor to operate.

According to one aspect of the invention, a multi-channel selector valve includes a housing; a rotor at least partially disposed within the housing and rotatable about an axis of rotation, the rotor having a first cam surface; and a stator at least partially disposed within the housing. The housing includes a plurality of flow controllers arranged about the axis of rotation of the rotor, each flow controller having an aperture, and a blocking member disposed adjacent to the cam surface, the blocking member selectively movable relative to the aperture to open and permit flow through the aperture.

According to one embodiment, the flow controllers are arranged concentrically about the stator.

According to one embodiment, the housing includes a plurality of radial slots, each slot corresponding to a respective blocking apparatus, each blocking apparatus being movable along a respective radial slot.

According to one embodiment, each blocking member comprises a rail configured to cooperate with a respective radial slot of the housing to guide the blocking member radially inward and outward relative to the axis of rotation.

According to one embodiment, the rotor includes a locating tab extending axially out from the rotor, and the housing comprises an annular slot that cooperates with the locating tab to maintain a position of the rotor within the housing.

According to one embodiment, the locating tab comprises a first portion that extends axially out from the rotor a first distance and a second portion that extends axially out from the rotor by a second distance different from the first distance.

According to one embodiment, the first distance is non-varying along the first portion.

According to one embodiment, the second distance varies along the second portion.

According to one embodiment, the selector valve further includes a detector attached to the housing and operative to detect an angular location of the second portion.

According to one embodiment, the rotor includes a hollow inner region defined by an inner radial surface of the rotor, the inner radial surface having a circular portion and a recessed portion, the inner radial surface defining the first cam surface.

According to one embodiment, a surface of the aperture distal from the first cam surface comprises a flat surface.

According to one embodiment, the stator has a hexagon shape, and the housing has a plurality of walls extending radially out from the stator, each wall of the plurality of walls corresponding to one corner of the hexagon shape.

According to one embodiment, each blocking member comprises a first surface proximal to the first cam surface and a second surface distal from the first cam surface, the second surface comprising a flat surface and a rounded surface adjacent to the flat surface.

According to one embodiment, when the blocking member is in a first position a size of the aperture is maximum, and when the blocking member is in a second position a size of the aperture is minimum.

According to one embodiment, the rotor comprises a cam.

According to one embodiment, the selector valve further includes an actuator coupled to the rotor and operative to selectively rotate the rotor about the axis of rotation, wherein rotation of the rotor positions the cam surface so as to selectively vary a range of motion of the blocking members.

According to one embodiment, the actuator comprises an electric motor, the selector valve further including a feedback device operatively coupled to at least one of the motor or the rotor and operative to provide data indicative of an angular position of at least part of the cam surface.

According to one embodiment, the rotor includes an inverted cam having a recess formed in a surface of the cam.

According to another aspect of the invention, a multi-channel selector valve includes: a housing; a cam at least partially disposed within the housing and rotatable about an axis of rotation; and a plurality of flow controllers arranged about the axis of rotation of the cam. Each flow controller includes an aperture, and a blocking member disposed adjacent to the cam, the blocking member selectively movable relative to the aperture to open and permit flow through the aperture, wherein rotation of the cam alters a range of motion of at least one of the blocking members.

According to another aspect of the invention a channel selector system includes: a selector valve as described herein; and a controller operatively coupled to the selector valve, wherein the controller is configured to: receive a command to open one flow controller of a plurality of flow controllers; and command the rotor to rotate the cam surface to an angular position that enables the one flow controller to open and permit the flow of fluid through the aperture.

According to one embodiment, the system further includes a sensor for detecting an angular position of each flow controller, and the controller is further configured to control rotation of the rotor to achieve an angular position of the cam that opens the one flow controller.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof.

DETAILED DESCRIPTION OF PREFERRED EMBODIMENT

Figure 1:
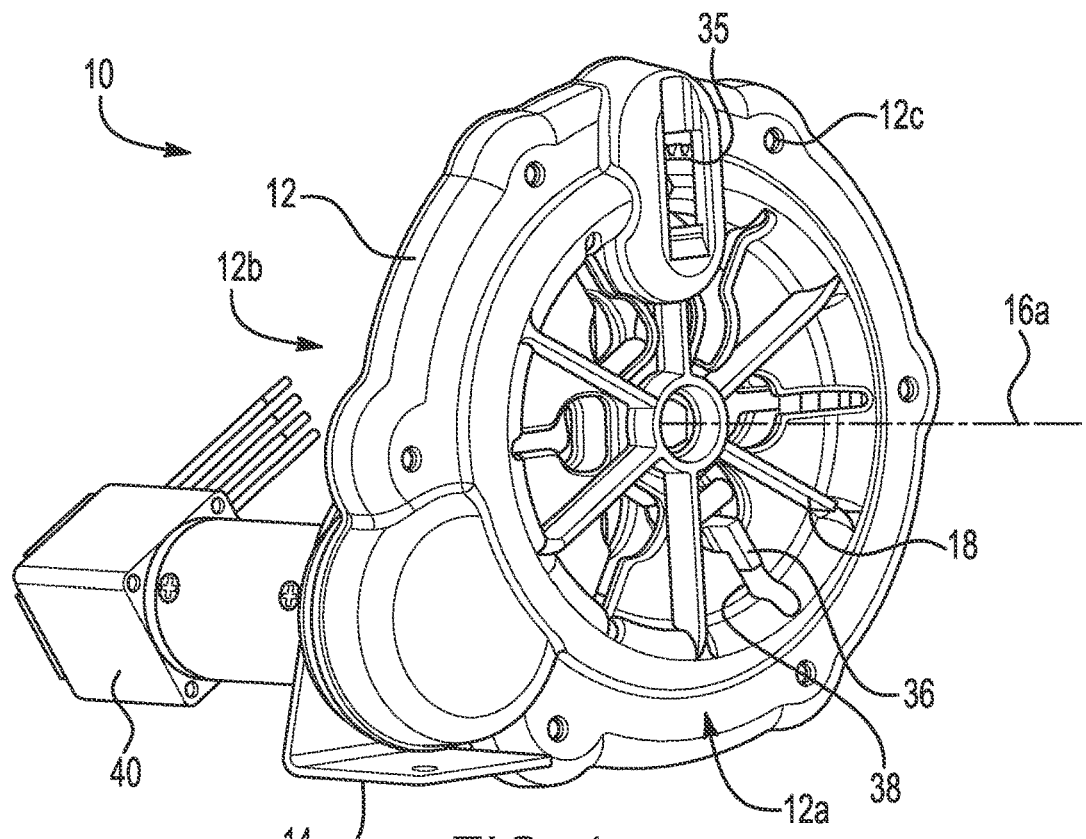
FIG. 1 is a perspective view of an exemplary channel selector valve in accordance with an embodiment of the invention.

Aspects of the present invention will now be described with reference to the drawings, wherein like reference numerals are used to refer to like elements throughout. Such aspects may be embodied in many different forms and should not be construed as limited to the embodiments set forth herein; rather, these embodiments are provided so that this disclosure will be thorough and complete, and will fully convey its scope to those skilled in the art. Further, it will be understood that the figures are not necessarily to scale.

The word "about" when immediately preceding a numerical value means a range of plus or minus 10% of that value, e.g., "about 50" means 45 to 55, "about 25,000" means 22,500 to 27,500, etc., unless the context of the disclosure indicates otherwise, or is inconsistent with such an interpretation. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

Referring initially to FIGS. 1-6, illustrated are various views of an exemplary multi-channel selector valve 10 in accordance with aspects of the invention. The selector valve 10 includes a housing 12 that provides a support structure for the other components of the selector valve. In the exemplary embodiment the housing 12 is formed as a two-piece housing having a first (front) housing part 12a and a second (rear) housing part 12b, the two housing parts 12a, 12b held together by fasteners 12c. The housing 12 may include a mount 14 formed integral with a portion of the housing 12, the mount 14 configured to secure the channel selector 10 to a support structure. Alternatively, the mount 14 may be separate from the housing 12 and fixed to the housing using fasteners 12c that secure the first and second housing parts together.

Arranged at an inner central-region of the housing 12 is a stator 16, which in the exemplary embodiment has a hexagonal shape, although other shapes are possible depending on the number of flow channels within the selector valve 10. For example, if three flow channels are desired then the stator 16 may have a triangular shape, if four flow channels are desired then the stator 16 may have a square shape, and so on. The stator 16 is held by the housing 12 such that the stator 16 is positionally fixed with respect to the housing 12. Preferably, the outer edges 17 of the stator 16 have rounded edges, which can reduce the stress seen by a tube when pinched between the stator and a blocking member, as discussed in further detail below.

A plurality of support walls 18 are formed in the housing 12 and extend radially out from the stator 16. In the illustrated embodiment six support walls 18 are shown, each support wall corresponding to one side of the stator 16. However, the number of support walls 18 can vary depending on the shape of the stator and/or other design needs. For example, if the stator is formed to have an octagon shape, then the housing 12 may include eight support walls (one for each side of the stator 16). The support walls 18 provide rigidity and structural support to the housing 12 as flow channels are closed.

Figure 6:
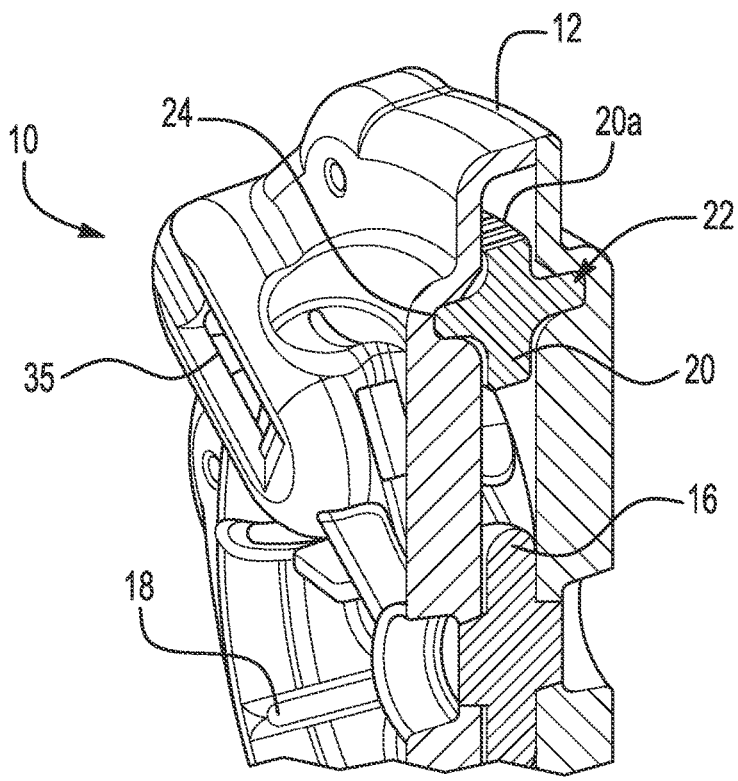
FIG. 6 is a cutaway view of the channel selector of FIG. 1 illustrating details of the housing, rotor and stator.

Disposed at least partially within the housing 12 is a rotor 20, an axis of rotation of the rotor 20 corresponding to a central axis of the stator 16. As best seen in FIG. 6, the rotor 20 includes a locating tab 22 extending axially out from the rotor 20. Additionally, and as best seen in FIG. 6, the housing 12 includes an annular slot 24, where the annular slot 24 cooperates with the locating tab 22 to both maintain a position of the rotor 20 within the housing 12 and to enable rotation of the rotor 20. The annular slot 24 may include a bearing or bushing (e.g., a low-friction nylon material) that minimizes friction between the locating tab 22 and the annular slot 24 due to rotation of the rotor 20. As will be discussed in more detail below, the rotor 20 includes a first cam surface 26 formed radially inward from an outer circumferential surface of the rotor 20, the first cam surface 26 enabling or inhibiting the flow of material through the channel selector 10.

Figure 4:
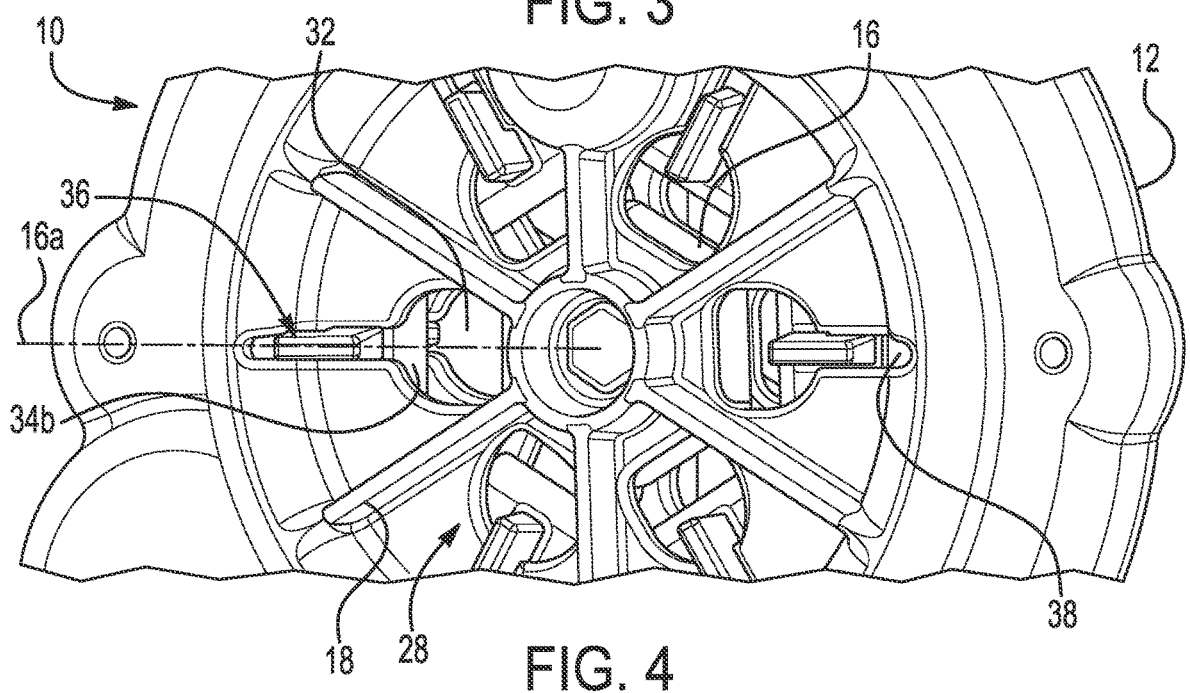
FIG. 4 is an enlarged view of the channel selector of FIG. 1 illustrating details of an exemplary stator and blocking members.

The housing 12 also includes a plurality of flow controllers 28 arranged concentrically about the center axis 16a of the stator 16, as best seen in FIG. 4. The flow controllers 28 are centered above each of the six sides of the exemplary hexagonal stator 16, the flow controllers 28 operative to hold a deformable tube 30, such as a hose or the like, in place. Each flow controller 28 includes an aperture 32 and a movable blocking member 34 disposed adjacent to the first cam surface 26, the blocking member 34 selectively movable relative to the stator 16 to enable or inhibit the flow of material through the aperture 32.

Each blocking member 34 comprises a first surface 34a proximal to the first cam surface 26 and a second surface 34b distal from the first cam surface 26. The first surface 34a is formed having a round contour (e.g., a half circle) and contacts the cam surface 26. The rounded surface eases the transition of the blocking member 34 along the different profiles of the cam surface 26, which makes it easier for the blocking member 34 to follow the cam profile. The second surface 34b is formed as a flat surface with rounded edges that reduce stress on the pinched tube 30. Further, the second surface 34b is parallel with sides of the hexagonal stator 16 to achieve uniform compression on the tube 30 when the blocking member 34 moves towards the stator 16 and pinches the tube 30 therebetween.

Each blocking member 34 includes a tab 36 arranged on opposing sides of the blocking member, where the tabs 36 engage radial slots 38 formed in each housing portion 12a, 12b. The combination of the tabs 36 on each blocking member 34 and the radial slots 38 in each housing portion 12a, 12b permits movement of the blocking member 34 radially inward or outward relative to the stator 16 while maintaining the orientation of the first surface relative to the cam surface 26 and the second surface 34b relative to the stator 16. Movement of the blocking member 34 relative to the stator 16 controls the flow of material through the tube 30. For example, when the blocking member 34 is in a first position distal from the stator 16 a size of the aperture 32 is maximum, thus permitting maximum flow through the tube 30. Conversely, when the blocking member 34 is in a second position proximal to the stator 16 a size of the aperture 32 is minimum, thus pinching the tube 30 and preventing the flow of material through the tube 30. As will be discussed in more detail below, the position of the blocking member 34 relative to the stator 16 is controlled by the cam surface 26.

Figure 2:
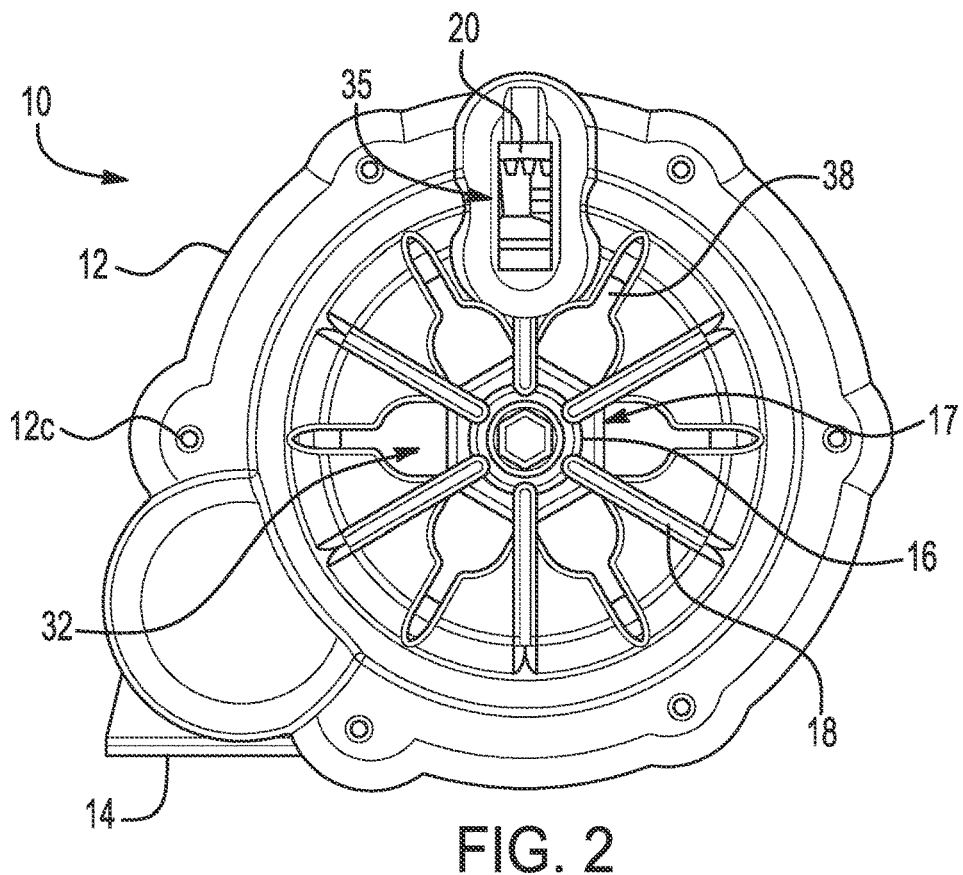
FIG. 2 is a front view of the channel selector valve of FIG. 1.

As seen in FIGS. 1, 2 and 6, one housing part 12a includes a mounting flange 35 for receiving a sensor, such as a limit switch or the like. The mounting flange 35 opens into the housing such that the sensor can monitor a position of the rotor 20. As will be discussed in more detail below with respect to FIG. 8, by monitoring a position of the rotor 20 a controller can determine a position of the cam surface 26 and thus know which flow controllers 28 are open and/or closed.

Figure 3:
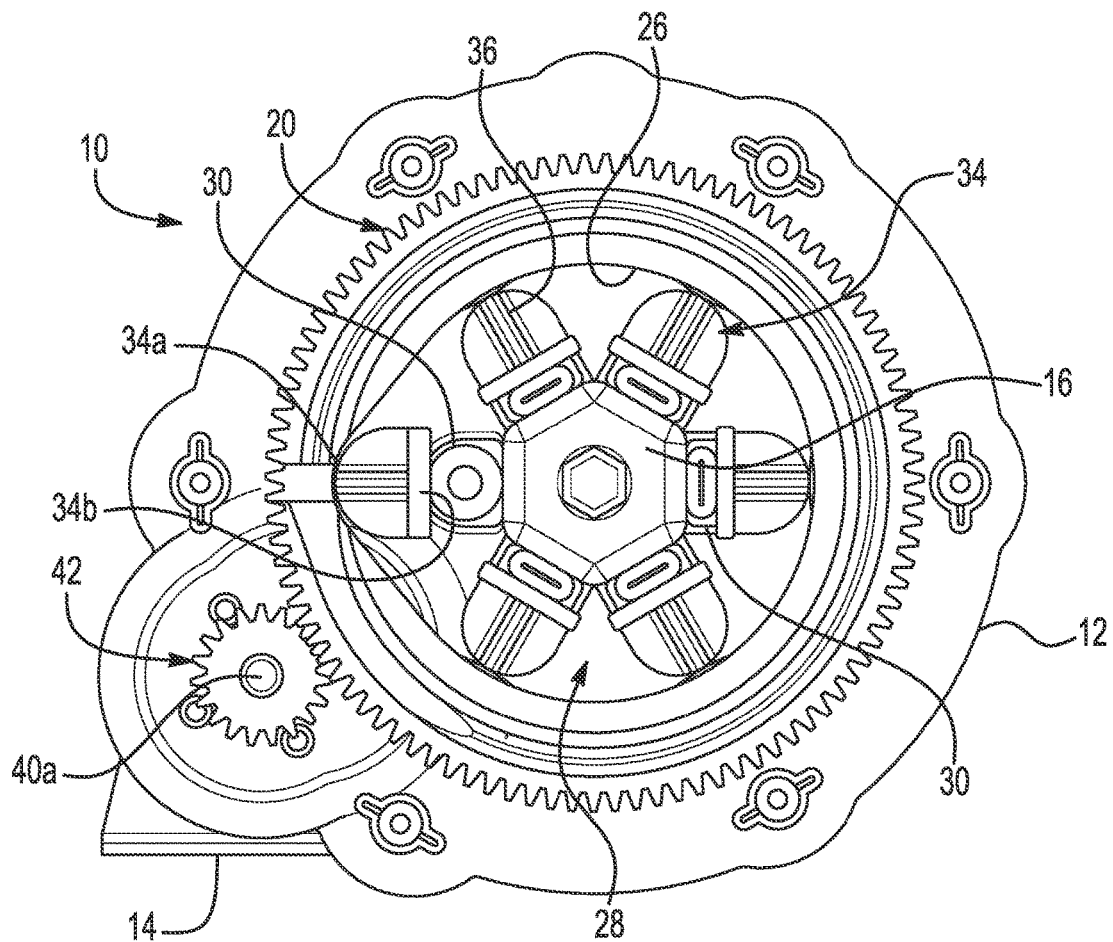
FIG. 3 is a front view of the channel selector valve of FIG. 1 with the front cover removed.

The selector valve 10 further includes an actuator 40 attached to the housing 12, the actuator 40 drivingly coupled to the rotor 20 to rotate the rotor 20 about its axis of rotation. Preferably the actuator 40 is an electric motor, such as a stepper motor. The actuator 40 can include a drive gear 42 arranged on an output shaft 40a of the actuator 40, as best seen in FIG. 3. The rotor 20, which is formed as a hollow ring gear having teeth 20a formed on an outer circumferential surface, meshes with the drive gear 42 such that rotation of the drive gear 42 provides corresponding rotation of the rotor 20. A feedback device may be integrated with the actuator 40 or provided separate from the actuator 40, the feedback device operatively coupled to at least one of an output shaft of the actuator 40 or to the rotor 20 and configured to provide data indicative of (or can be used to determine) an angular position of the output shaft 40a, the rotor 20 and/or the cam surface 26.

Figure 5:
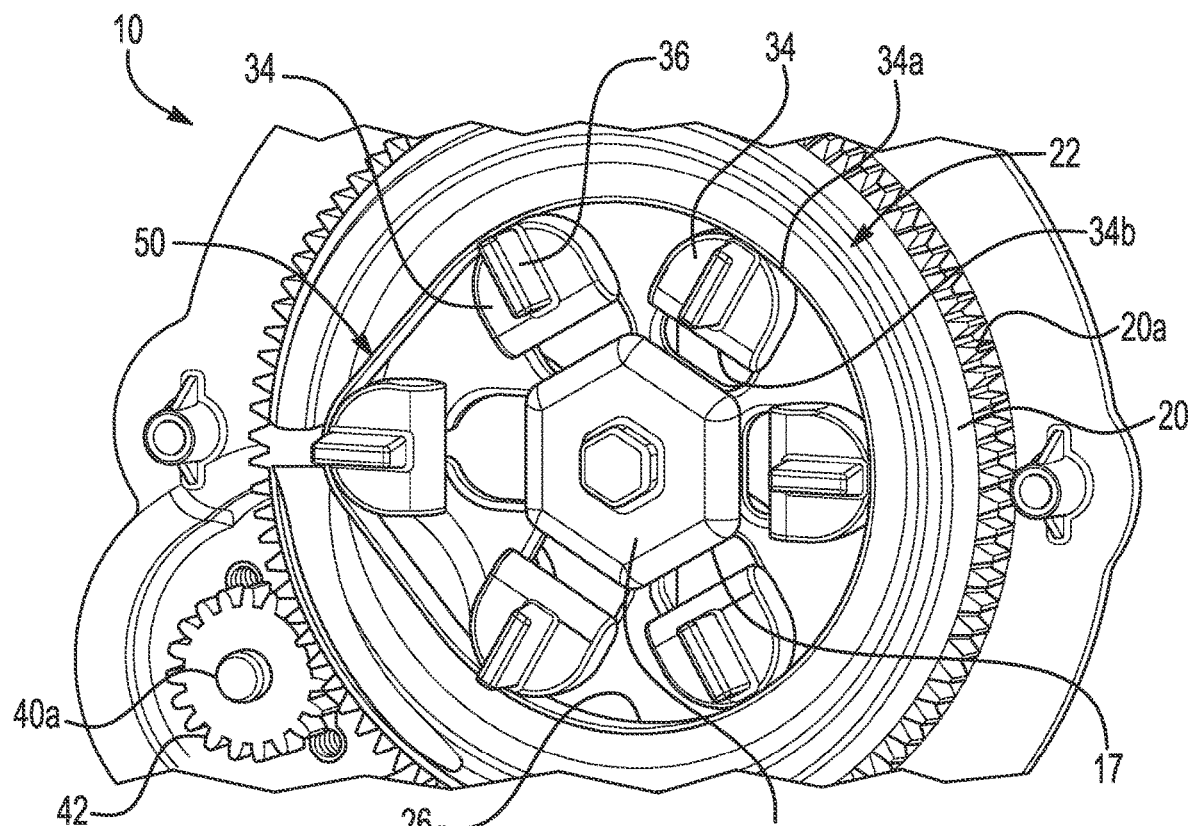
FIG. 5 is an enlarged view of the channel selector of FIG. 1 with the front cover removed, illustrating details of an exemplary rotor and cam surface.
Figure 7:
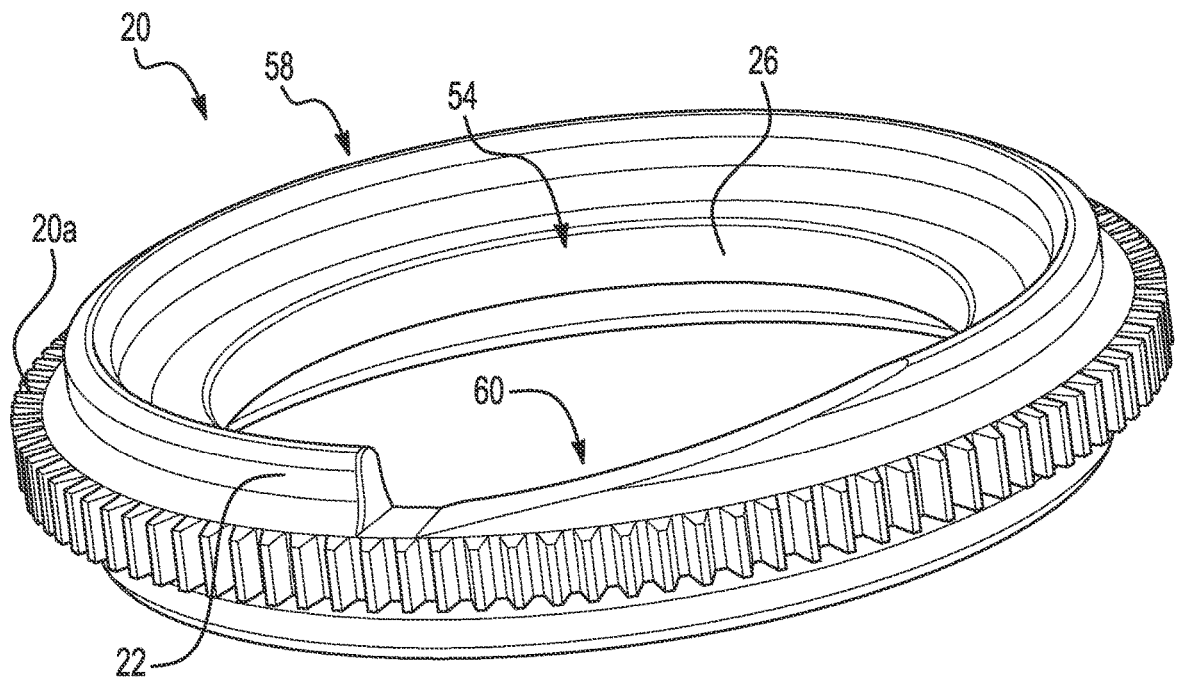
FIG. 7 illustrates an exemplary rotor that may be used in the channel selector valve of FIGS. 1-6.

With additional reference to FIG. 7, illustrated is a perspective view of an exemplary rotor 20 that may be used in the selector valve 10 according to the invention. As can be seen, the rotor 20 is formed as a hollow gear having gear teeth 20a formed along an outer circumferential edge of the rotor 20. An inner surface 54 of the hollow rotor 20 defines the cam surface 26, which is generally circular in shape but includes a recess 50 as best seen in FIG. 5. A diameter of the inner surface 54 is selected to hold the blocking devices 34 at a distance from the stator 16 that compresses each tube 30 to a desired percentage of the original tube diameter.

Depending on the angular orientation of the rotor 20 (and thus the recess 50), a range of motion of one or more blocking members 34 may be increased relative to the range of motion of other blocking members 34. This increased range of motion enables the one or more blocking member to move radially outward relative to the stator 16. The tubes 30 placed within each aperture 32 are elastic and thus store energy when compressed, the stored energy tending to urge the blocking member 34 radially outward. As the rotor rotates the recess 50 is aligned with one blocking member 34, thereby increasing the possible range of motion of that blocking member. The elastic energy of the compressed/pinched tube pushes the blocking member 34 into the recess 50 and opens a flow path through the tube 30 through which material may flow.

The rotor also includes the previously-described locating tab 22 that is formed as an annular ring. The locating tab 22 includes a first portion 58 that extends axially out from the rotor 20 by a first non-varying distance and a second portion 60 that extends axially out from the rotor 20 by a second distance. In one embodiment, the second distance varies over the second portion 60 of the locating tab 22, while in another embodiment the second distance is non-varying. The second portion 60 is placed at a position on the rotor 20 to detect a specific orientation of the recess 50 and thus the open/closed state of the blocking members 34. In this manner, a controller can determine the angular orientation of the second portion 60 (and thus the rotor 20 and recess 50) and, based on the detected orientation, the controller can determined the status of each blocking member 34 (e.g., all blocking members are closed, which blocking member(s) are open).

A sensor is mounted to flange 35 of the housing part 12a and detects a transition from the first portion 58 to the second portion 60. For example, the sensor may be a limit switch that is in contact with the locating tab 22. As the rotor 20 rotates about its axis, the locating tab 22 also rotates and the limit switch detects the transition in height between the first portion 58 and the second portion 60 of the locating tab 22. As will be appreciated, other types of sensors may be employed. For example, instead of a limit switch a proximity sensor may be utilized to detect the transition from the first portion to the second portion. In such instance, the second portion 60 may be formed as a notch in the locating tab 22 (i.e., the height of the second portion does not vary). A hall-effect sensor may also be used to detect the second portion 60 of the rotor 20.

Figure 8A:
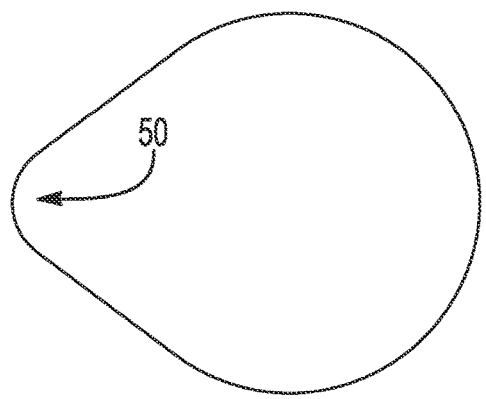
FIGS. 8A and 8B illustrate exemplary cam profiles that may be used to open and close flow channels in the selector valve according to the invention.
Figure 8B:
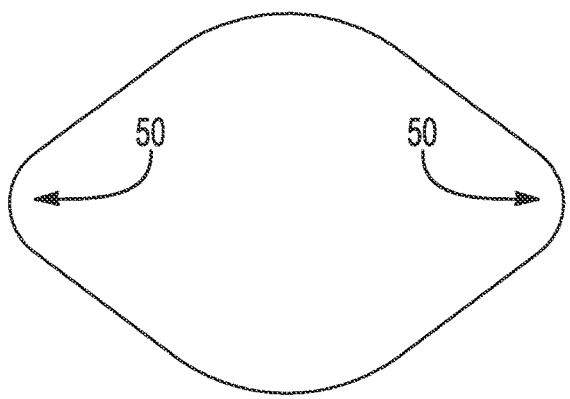

While the illustrated embodiment is shown with six flow controllers 28 with only one flow controller open at a time, it will be appreciated that other embodiments are possible. For example, the housing 12 and stator 16 may be configured for more or fewer flow controllers. Additionally, instead of one flow controller 28 being open at a time, the profile of the cam surface 26 can be modified such that multiple flow controllers are open at the same time and/or the open/close state of multiple flow controllers overlap (e.g., as one flow controller is beginning to close another flow controller may beginning to open, such that both are at least partially open at the same time). FIG. 8A illustrates a cam profile that opens only one flow controller at a time as shown in FIGS. 1-7, while FIG. 8B illustrates a cam profile that opens two oppositely arranged flow controllers at the same time. As will be appreciated, other cam profiles are possible depending on the specific application. Further, when multiple opening events are implemented, the size of each recess 50 can be different such that one recess permits more flow than the other recess. Additionally or alternatively, the duration of each recess 50 can be different such that one recess maintains an open state of a flow controller longer than the other recess. In yet another embodiment, the apertures 32 of the flow controllers 28 can be modified such that some accommodate a first inner or outer diameter tube 30 while other flow controllers accommodate a second inner or outer diameter tube, and so on, where the diameters of the respective tubes are different.

Figure 9:
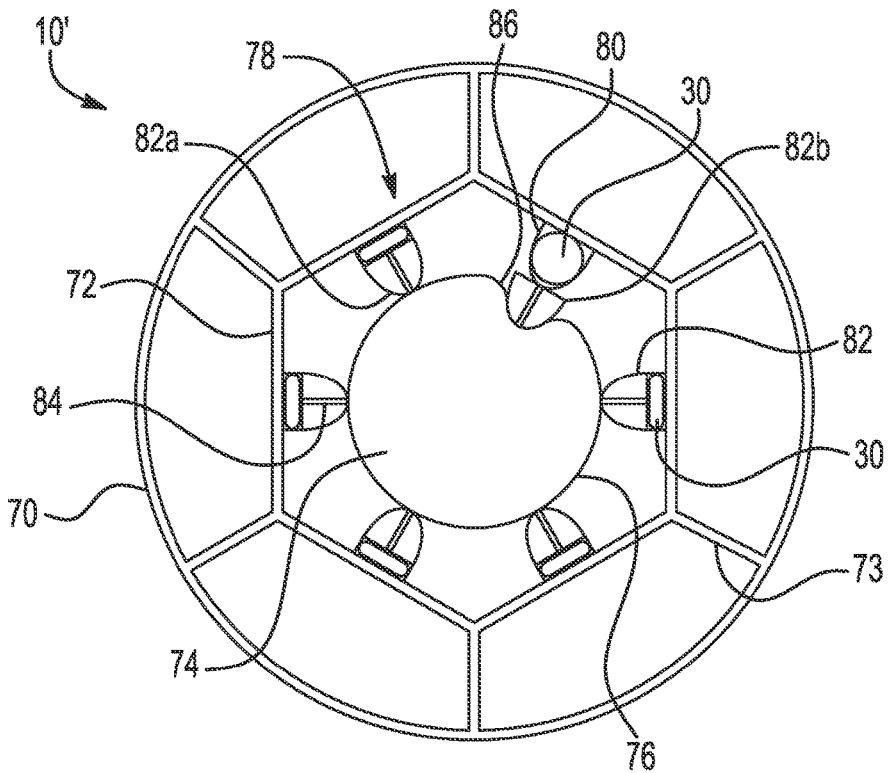
FIG. 9 is a simple schematic view of a channel selector in accordance with another embodiment of the invention.

The geometry of the mechanism that controls flow can be inverted. In other words, instead of a large hollow rotor with a recess in the inner diameter that surrounds the flow controllers and tubes, the tubes sit around the exterior of the channel selector, and a rotor is arranged in the center. FIG. 9 illustrates a channel selector valve 10' that is inverted relative to the embodiment of FIGS. 1-7. The selector valve 10' includes a housing 70 that provides a support structure for the other components of the selector valve. Like the embodiment of FIGS. 1-7, the housing 12 can be formed as a two-piece housing having a first (front) housing part and a second (rear) housing part, the two housing parts held together by fasteners (not shown). FIG. 9 illustrates the selector valve with the front housing removed to better view the inner portions of the selector valve.

Arranged at an inner central-region of the housing 12 is a stator 72, which in the exemplary embodiment has a hexagonal shape, although other shapes are possible depending on the number of flow channels. The stator 72 may be formed integral with the housing 70 or as a separate component that is attached to the housing via fasteners such that the stator 72 is positionally fixed with respect to the housing 70. Support beams 73 may be formed in the housing 70 coupling the stator 72 to the housing 70 to provide added rigidity to the overall structure. Like the embodiment of FIGS. 1-6, the edges of the stator 72 that contact the tube 30 have rounded edges to reduce the stress seen by a tube when pinched between the stator and a blocking member.

Disposed within the housing 70 is a rotor 74, the rotor taking the form of an inverted cam having a cam surface 76, where an axis of rotation of the rotor 74 corresponds to a central axis of the stator 72. The rotor may be directly or indirectly coupled to an actuator to rotate the cam surface 76 and enables or inhibit the flow of material through the channel selector 10'. In the embodiment of FIG. 9, the rotor 74 is supported by a surface (not shown) of the stator and/or housing that includes a bearing or bushing, and a portion of the rotor rides on the bearing or bushing.

The housing 70 also includes a plurality of flow controllers 78 arranged concentrically about the center axis of the stator 72 and the rotor 74. The flow controllers 78 are centered below each of the six sides of the exemplary hexagonal stator 72, the flow controllers 78 operative to hold a deformable tube 30, such as a hose or the like, in place. Each flow controller 78 includes an aperture 80 and a movable blocking member 82 disposed adjacent to the first cam surface 26, the blocking member 82 selectively movable relative to the stator 72 to enable or inhibit the flow of material through the aperture 80.

Each blocking member 82 comprises a first surface 82a proximal to the first cam surface 76 and a second surface 82b distal from the first cam surface 76. The first surface 82a is formed having a round contour (e.g., a half circle) and contacts the cam surface 76. The second surface 82b is formed as a flat surface with rounded edges, the flat surface parallel with sides of the hexagonal stator 72 to achieve uniform compression on the tube 30 when the blocking member 82 moves towards the stator 72 and pinches a tube 30 therebetween.

Each blocking member 82 includes a tab 84 arranged on opposing sides of the blocking member, where the tabs 84 engage radial slots (not shown in FIG. 9) formed in each housing portion. The combination of the tabs 84 on each blocking member 82 and the radial slots in each housing portion permits movement of the blocking member 82 radially inward or outward relative to the stator 72 while maintaining the orientation of the first surface 82a relative to the rotor 74 and the orientation of the second surface 82b relative to the stator 72. Movement of the blocking member 82 relative to the stator 72 controls the flow of material through the tube 30. For example, when the blocking member 82 is in a first position distal from the stator 72 a size of the aperture 80 is maximum, thus permitting maximum flow through the tube 30. Conversely, when the blocking member 82 is in a second position proximal to the stator 72 a size of the aperture 80 is minimum, thus pinching the tube 30 and preventing the flow of material through the tube 30.

The position of the blocking member 82 relative to the stator 72 is controlled by the cam surface 76. In the embodiment of FIG. 9, the cam surface 76 is generally circular, with a recess 86 arranged along a portion of the surface. Depending on the angular orientation of the rotor 74 (and thus the recess 86), a range of motion of one or more blocking members 82 may be increased relative to the range of motion of other blocking members 82. This increased range of motion enables the one or more blocking member to move radially inward relative to the stator 72, and the elastic tubes 30 placed within each aperture 80 tend to urge the blocking member 82 radially outward. As the rotor rotates the recess 86 is aligned with one blocking member 82, thereby increasing the possible range of motion of that blocking member. The elastic energy of the compressed/ pinched tube 30 pushes the blocking member 82 into the recess 86 and opens a flow path through the tube 30 through which material may flow.

The rotor 74 is coupled to an actuator (not shown in FIG. 9), such as an electric motor or the like, to drive the rotor to a desired angular position. For example, an output shaft of the actuator may be directly coupled to the rotor or coupled to the rotor through a gearbox. A feedback device coupled to the actuator and/or the rotor enables the angular position of the recess 86 to be determined.

Figure 10:
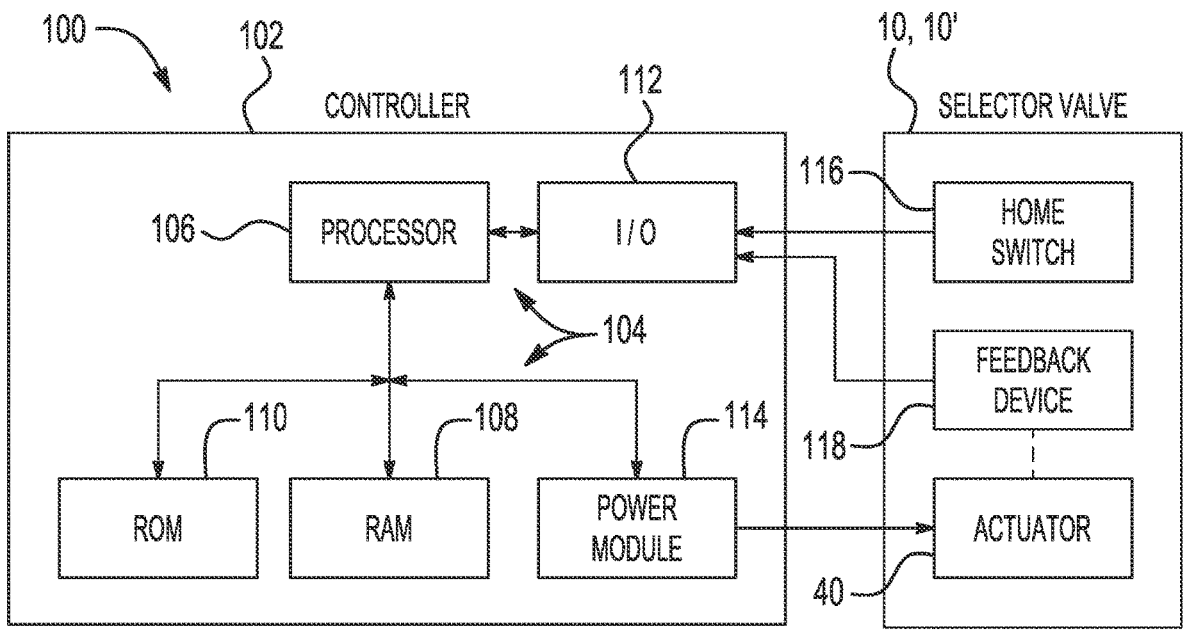
FIG. 10 is a block diagram of a system that employs the channel selector valve according to FIGS. 1-7.

Referring now to FIG. 10, illustrated is a block diagram of an exemplary channel selector valve system 100 in accordance with the invention. The system includes a controller 102 that oversees operation of the selector valve 10. Although the controller 102 is illustrated being implemented as a processor executing software code, the controller 102 may take other forms. For example, the controller 102 may be implemented in hardware circuit(s) or a combination of a hardware circuit and a processor executing code. The controller 102 includes a bus 104 or other communication mechanism for communicating information, and a processor 106 coupled with the bus 104 for processing information. The controller 102 also includes a main memory 108, such as a random access memory (RAM) or other dynamic storage device, coupled to the bus 104 for storing information and instructions to be executed by the processor 104. The main memory 108 also may be used for storing temporary variables or other intermediate information during execution of instructions to be executed by the processor 104.

The controller 102 further includes a computer readable medium such as a read only memory (ROM) 110 or other static storage device coupled to the bus 104 for storing static information and instructions for the processor 106. The term "computer-readable medium" as used herein refers to any medium that participates in providing instructions to the processor 106 for execution. Such a medium may take many forms, including but not limited to, non-volatile media and volatile media. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

The controller 102 further includes an input/output (I/O) module 112, including analog inputs/outputs, digital inputs/outputs, and/or serial communication port. The I/O module 112 enables the processor 106 to communicate with and/or control devices external to the controller 102, such as the selector valve 10, 10'.

The controller 102 optionally includes a power module 114 for controlling the actuator 40. For example, the power module may be a motor controller that is operative to control an electric motor. While the power module is illustrated as part of the controller 102, the power module 114 may be separate from the controller 102. The processor 106 communicates with the power module 114 through the bus 104 (or through the I/O module 112 if the power module is separate from the controller 102), and can command the power module to drive the actuator 40 to operate the selector valve 10, 10' to position the rotor at a desired angular orientation that opens and/or closes one or more flow controllers.

Moving to the selector valve 10, the actuator 40 receives power from the power module 114 to drive the selector valve. In driving the selector valve 10, the processor 106 determines a home location of the rotor 20 based on data from the home switch 116. The home switch 116 detects a transition from the first portion 58 of the rotor 20 to the second portion 60 of the rotor 20 and provides this data to the processor 106 via the I/O module 112. Upon detecting the transition, the processor 106 knows the exact orientation of the rotor 20 within the housing 12. Upon further rotation of the rotor 20, the processor, through the I/O module 112, receives rotation data from feedback device 118, such as an encoder, a resolver or the like. The processor 106 then can determine how far the rotor 20 has moved from the home position based on the data provided by the feedback device (i.e., by counting pulses, etc.) and deduce the angular position of the rotor 20 within the housing 12.

By knowing the angular position of the rotor 20, 74 within the housing, the processor 106 can drive the rotor 20, 74 to a desired angular position, thereby opening one (or more) of the flow controllers 28, 78. In this regard, the processor 106 can execute a program stored in a computer readable medium, such as ROM 110, to selectively control the flow of material through the selector valve 10, 10'. For example, the processor 106 can receive, from a user input device, a command to open one of the flow controllers 28, 78. Based on the user command and the known orientation of the rotor 20, 74, the processor 106 can command the actuator 40 to rotate the rotor 20, 74 (and thus the cam surface) to an angular position that enables the one flow controller to open and permit the flow of fluid through the aperture.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

What is claimed is:

1. A multi-channel selector valve, comprising:
    a housing;
    a rotor at least partially disposed within the housing and rotatable about an axis of rotation, the rotor comprising a first cam surface;
    a stator at least partially disposed within the housing, the stator disposed within an inner circumferential surface of the rotor,
    wherein the housing includes a plurality of flow controllers arranged about the axis of rotation of the rotor, each flow controller comprising
        an aperture, and
        a blocking member disposed adjacent to the cam surface, the blocking member selectively movable relative to the aperture to open and permit flow through the aperture.

2. The selector valve according to claim 1, wherein the flow controllers are arranged concentrically about the stator.

3. The selector valve according to claim 1, wherein the housing comprises a plurality of radial slots, each slot corresponding to a respective blocking member, each blocking member being movable along a respective radial slot.

4. The selector valve according to claim 3, wherein each blocking member comprises a body portion and a rail protruding out from the body portion, the rail configured to cooperate with a respective radial slot of the housing to guide the blocking member radially inward and outward relative to the axis of rotation.

5. The selector valve according to claim 1, wherein the rotor comprises a locating tab extending axially out from the rotor, and the housing comprises an annular slot that cooperates with the locating tab to maintain a position of the rotor within the housing.

6. The selector valve according to claim 5, wherein the locating tab comprises a first portion that extends axially out from the rotor a first distance and a second portion that extends axially out from the rotor by a second distance different from the first distance.

7. The selector valve according to claim 6, wherein the first distance is non-varying along the first portion.

8. The selector valve according to claim 6, further comprising a detector attached to the housing and operative to detect an angular location of the second portion.

9. The selector valve according to claim 1, wherein a surface of the aperture distal from the first cam surface comprises a flat surface.

10. The selector valve according to claim 1, wherein the stator comprises a hexagon shape, and the housing comprises a plurality of walls extending radially out from the stator, each wall of the plurality of walls corresponding to one corner of the hexagon shape.

11. The selector valve according to claim 1, wherein each blocking member comprises a first surface proximal to the first cam surface and a second surface distal from the first cam surface, the second surface comprising a flat surface and a rounded surface adjacent to the flat surface.

12. The selector valve according to claim 1, wherein when the blocking member is in a first position a size of the aperture is maximum, and when the blocking member is in a second position a size of the aperture is minimum.

13. The selector valve according to claim 1, wherein the rotor comprises a cam.

14. The selector valve according to claim 1, further comprising an actuator coupled to the rotor and operative to selectively rotate the rotor about the axis of rotation, wherein rotation of the rotor positions the cam surface so as to selectively vary a range of motion of the blocking members.

15. The selector valve according to claim 14, wherein the actuator comprises an electric motor, further comprising a feedback device operatively coupled to at least one of the motor or the rotor and operative to provide data indicative of an angular position of at least part of the cam surface.

16. The channel selector valve according to claim 1, wherein the rotor comprises an inverted cam having a recess formed in a surface of the cam.

17. A channel selector system, comprising:
the selector valve according to claim 1; and
a controller operatively coupled to the selector valve, wherein the control is configured to:
receive a command to open one flow controller of a plurality of flow controllers; and
command the rotor to rotate the cam surface to an angular position that enables the one flow controller to open and permit the flow of fluid through the aperture.

18. The system according to claim 17, further comprising a sensor for detecting an angular position of each flow controller, and the controller is further configured to control rotation of the rotor to achieve an angular position of the cam that opens the one flow controller.

19. A multi-channel selector valve, comprising:
a housing;
a rotor at least partially disposed within the housing and rotatable about an axis of rotation, the rotor comprising a first cam surface;
a stator at least partially disposed within the housing,
wherein the housing includes a plurality of flow controllers arranged about the axis of rotation of the rotor, each flow controller comprising
an aperture, and
a blocking member disposed adjacent to the cam surface, the blocking member selectively movable relative to the aperture to open and permit flow through the aperture,
wherein the rotor comprises a locating tab extending axially out from the rotor, and the housing comprises an annular slot that cooperates with the locating tab to maintain a position of the rotor within the housing,
wherein the locating tab comprises a first portion that extends axially out from the rotor a first distance and a second portion that extends axially out from the rotor by a second distance different from the first distance, and wherein the second distance varies along the second portion.

20. A multi-channel selector valve, comprising:
a housing;
a rotor at least partially disposed within the housing and rotatable about an axis of rotation, the rotor comprising a first cam surface;
a stator at least partially disposed within the housing,
wherein the housing includes a plurality of flow controllers arranged about the axis of rotation of the rotor, each flow controller comprising
an aperture, and
a blocking member disposed adjacent to the cam surface, the blocking member selectively movable relative to the aperture to open and permit flow through the aperture, wherein the rotor comprises a hollow inner region defined by an inner radial surface of the rotor, the inner radial surface including a circular portion and a recessed portion, the inner radial surface defining the first cam surface.

* * * * *